May 18, 1971

K. SENNEWALD ETAL 3,579,309

COLUMN FOR CARRYING OUT ORGANIC CHEMICAL REACTIONS
IN CONTACT WITH FINE, PARTICULATE CATALYSTS

Filed Oct. 7, 1968

2,579,309
Patented May 18, 1971

3,579,309
COLUMN FOR CARRYING OUT ORGANIC CHEMICAL REACTIONS IN CONTACT WITH FINE, PARTICULATE CATALYSTS
Kurt Sennewald and Klaus Gehrmann, Knapsack, near Cologne, and Stefan Schafer, Bruhl, near Cologne, Germany, assignors to Knapsack Aktiengesellschaft, Knapsack, near Cologne, Germany
Filed Oct. 7, 1968, Ser. No. 765,337
Claims priority, application Germany, Nov. 18, 1967,
P 16 67 139.9
Int. Cl. B01j 9/04; C07c 69/66
U.S. Cl. 23—288                                   2 Claims

ABSTRACT OF THE DISCLOSURE

Column for carrying out organic chemical reactions in contact with fine, particulate catalysts, the column being formed with interchangeable, catalyst-receiving rection vessels, which are arranged outside the column, preferably in staggered relationship to each other. between individual column tray outlet and inlet openings projecting outwardly.

---

Figure 1:
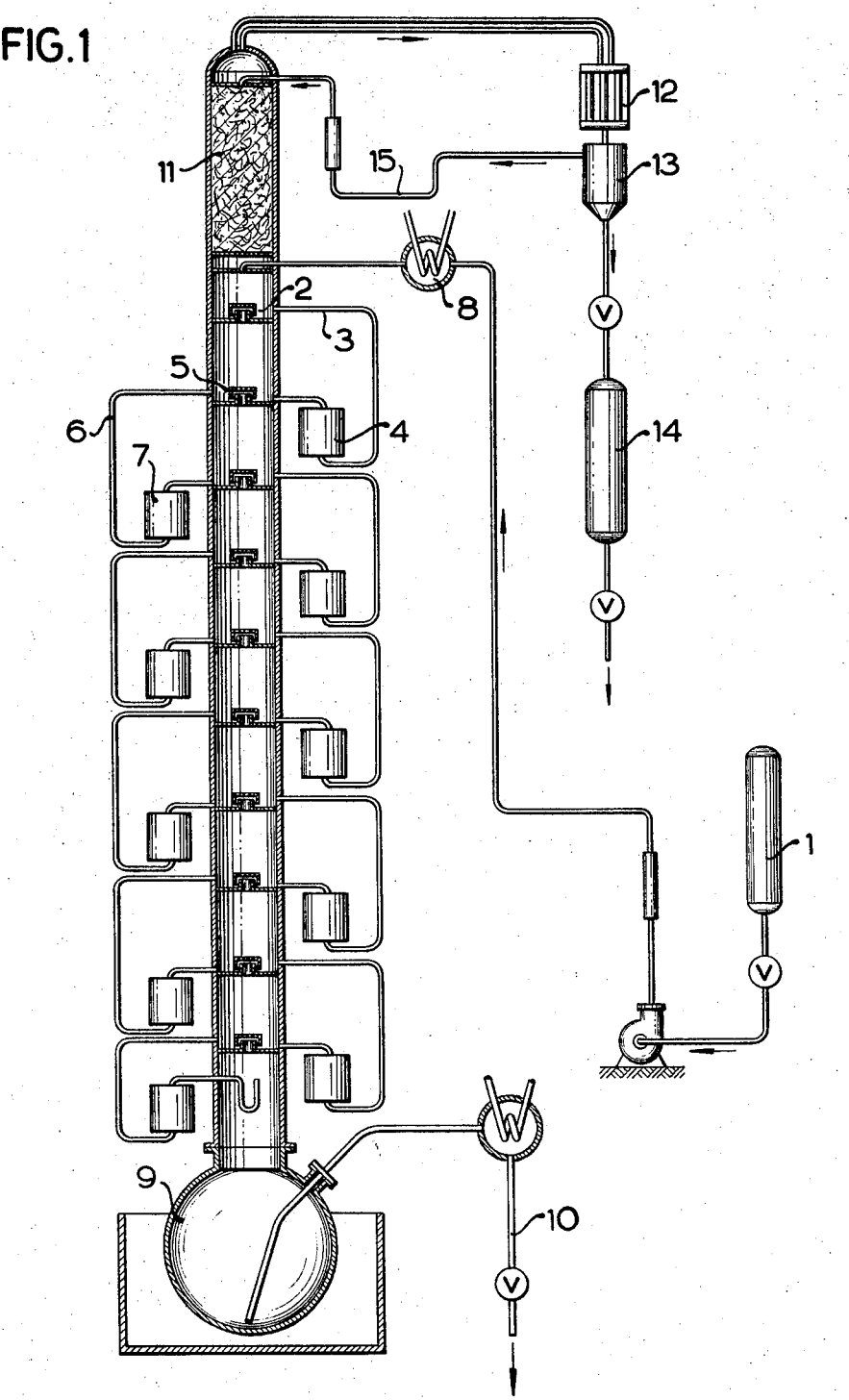

It is known that a plurality of organic chemical reactions can be carried out in contact with ion exchangers. Given continuous rection, feed mixture is generally passed through an ion exchange column. Especially in the case of esterification reactions, the conversion rate is found to be determined by the particular equilibrium position prevailing, given sufficient contact times. In those cases in which very unfavorable equilibrium positions found to prevail, it is often possible to produce just acceptable conversion rates by subdividing the ion exchange column into two esterification zones and a dehydration zone arranged therebetween.

An apparatus arranged for esterification and simultaneous distillative isolation of at least one of the esterification products—either water or ester—from further components is most advantageously used for continuously reducing the quantity of water and/or ester produced by alcohol esterification of carboxylic acids, and for producing fairly quantitative conversion rates.

Such apparatus must provide for sufficient contact times. For a plurality of esterification reactions, the contact time is between 1 and 2 hours; however, substantially longer contact times may be needed for ester interchange reactions. In order to obviate the formation of fines, it is also desirable for the ion exchanger to prevent any flow forces from imparting motion to it.

A column for carrying out organic chemical reactions in contact with fine, particulate catalysts has already been described in German Pat. 1,075,613, the column being formed with wire baskets, which receive the fine, particulate catalyst and are arranged in a manner similar to fillers. This means low working capacity for the column. Bearing in mind that the wire baskets substantially come into contact with the vapor phase of the reactants only, it is clear that the contact time obtainable is too short for obtaining satisfactory conversion rates. In accordance with a further feature of the process described in German Pat. 1,075,613, the fine, particulate fillers can be placed on the trays of a tray column of which the offtake-openings are formed with inclined, fine-meshed screens.

These bubble tray columns have also been found to entail the formation of fines, which is disadvantageous. Furthermore, given breakdown of the vapor column prevailing in the apparatus, it is necessary to use expensive arrangements to prevent the ion exchanger from being carried down to lower trays, through the individual trays.

It has now been found that columns, wherein the catalyst is placed in containers, which are arranged between the outlet and inlet openings of the individual column trays (cf. FIG. 2 of the accompanying drawing), are especially useful for carrying out organic chemical reactions in contact with fine, particulate catalysts. The outlet and inlet openings which are assigned to the individual trays are extended towards the column outside. This means that the reaction vessels can be flanged to the column outside at readily accessible places.

Depending on the contact time needed, it is possible to use containers of larger or smaller dimensions without any modification of the column itself. Of decisive importance is the fact that, unlike that in the apparatus described in German Pat. 1,075,613, the catalyst now lies exclusively in the condensate path and comes into contact with liquid only. This enables the space time yield to be improved.

The bubble tray column shown in FIG. 1 of the accompanying drawing, which will be described hereinafter, is used, for example, in those particular cases in which carboxylic acids are esterified by means of scarcely water-soluble alcohols. The column is operated in the following manner:

The column is set to work by supplying its base 9 with alcohol and heating it. Once a vapor column and vaporization equilibrium are found to have been established feed mixture composed of carboxylic acid and alcohol in a molar ratio substantially of 1:1.1 is drawn from a reservoir 1, preheated by means of heater 8 and pumped to the uppermost tray 2 of the tray column. The mixture heated to reaction temperature travels through discharge line 3 to reactor 4 which is filled with ion exchanger and in which the mixture partially undergoes transformation. The reaction mixture then travels to the next lower tray 5, where it is dehydrated by distillative treatment to be conveyed later through discharge line 6 to the next reactor 7. The alternate esterification and dehydration steps are continued over all stages necessary for the reaction until a substantially acid-free ester/alcohol-mixture is found to be delivered to base 9 surrounded by a heating bath. The mixture can be withdrawn through cooled pipe 10.

The water-containing vapor mixture travels through packed column portion 11, of which the length is a function of the acid's boiling point, and is condensed in condenser 12. In phase separator 13, the condensate is found to separate into an organic phase and an aqueous phase. The water is withdrawn via a measuring vessel 14 and the organic phase, which most frequently is an ester/alcohol-mixture, is recycled through line 15 to the packed column portion.

The above apparatus can be operated in vacuo, at atmospheric pressure or overpressure, depending on the reaction temperature to be produced.

In most cases, substantially quantitative conversion rates can be obtained with the present apparatus while using an extremely small alcohol/acid molar ratio of 1.05 to 1.1:1. This enables ester concentrations between 93 and 96% by weight to be produced in the effluent base product. The ester yields are as high as 96 to 98%.

Figure 2:
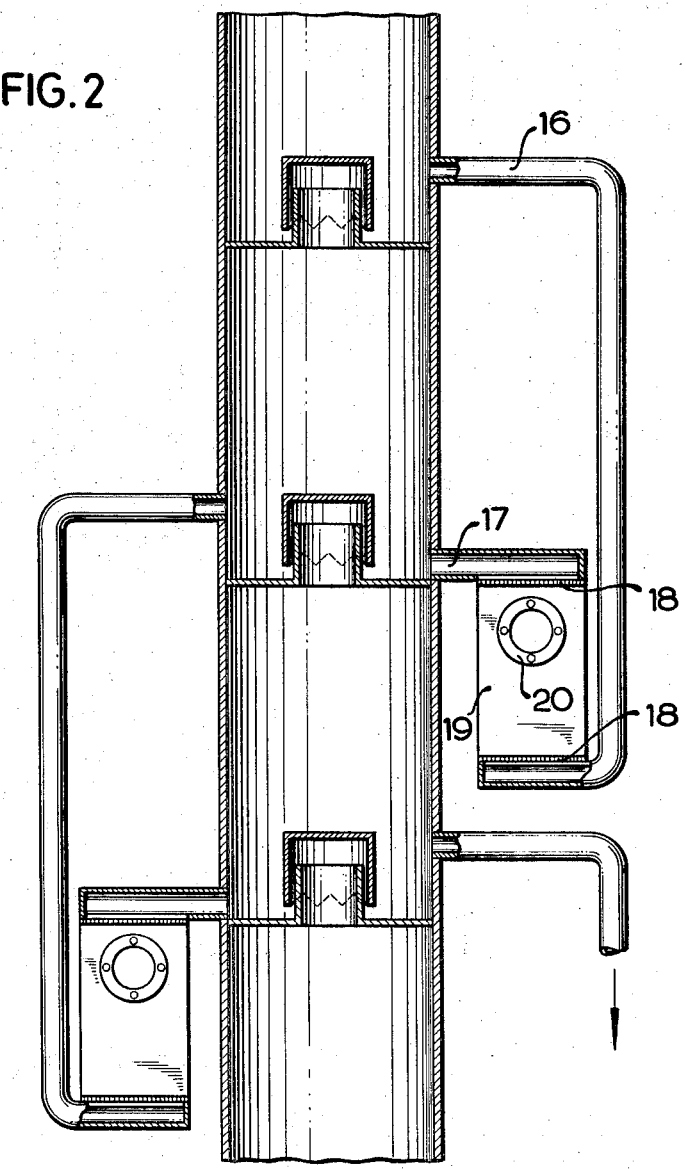

FIG. 2 of the accompanying drawing is a representation on an enlarged scale of a section of the bubble tray column shown in FIG. 1. As can be seen, a catalyst-receiving reactor 19 is arranged between an upper tray outlet 16 and a lower tray inlet 17. Reactor 19 has a short feed pipe 20 mounted thereon and is bounded by two filter plates 18.

The present invention relates more particularly to a column for carrying out organic chemical reactions in contact with fine, particulate catalysts, the column being formed with interchangeable, catalyst-receiving reactors, which are arranged outside the column between individual column tray outlet and inlet openings projecting outwardly. The reactors outside the column are preferably arranged in staggered relationship to each other in a manner such as that shown in the accompanying drawings.

The column of the present invention can be used for carrying out esterification and ester interchange reactions and in addition for transacetalization reactions as well as for the production of ethers. For example, it can be used for the production of the methyl, ethyl, butyl esters of acrylic acid and the methyl or amyl esters of acetic acid.

EXAMPLE

The example was carried out using a tray column comprising 10 trays, whose individual inlet and outlet openings were arranged so as to communicate with their associated reactors (cf. FIG. 1). Substantially 500 cc. catalyst (e.g. acid ion exchanger Lewatit S100) were placed in each of the 10 reactors.

The column was operated under a pressure of 100 mm. mercury (absolute). This produced a mean reaction temperature of 60° C. The column base was first fed with 3 liters butanol which was heated to boiling (100 mm. mercury; B.P.=70° C.; complete reflux). In this manner, the reaction vessels and separator were filled and heated to reaction temperature. A further 2 liters butanol were supplied during that time. Feed mixture was then pumped into the apparatus.

A mixture of 101 grams acrylic acid and 113 grams butanol (moler ratio=1:1.085) was fed per hour to the uppermost tray of the column. After 30 to 40 hours, the material in the apparatus was found to have been exchanged; the reaction products, which now commenced to form, were found to have a constant composition. Vapor mixture consisting of water, butanol and ester, which accumulated near the column head (55° C.), was condensed and delivered to a separator; a lower, aqueous, phase, which still contained substantially 4.5% butanol and traces of ester, was removed therefrom at a rate of 26.5 grams per hour.

A butanol/ester mixture, which was found to separate as the upper phase, was refluxed to the packed column portion. The reflux rate was 0.4 to 0.5 liter per hour.

From the column base (88° C.) there were removed per hour 187.1 grams of a mixture containing 94.1% by weight buty lacrylate, 0.16% by weight acrylic acid, 2.9% by weight butanol, 2.5% by weight butyl butoxypropionate and small proportions of dibutyl ether.

The acrylic acid conversion rate was found to be 99.7%.

Butyl acrylate was obtained in a yield of 98.3%, based on the acrylic acid transformed.

What is claimed is:

1. Distilling apparatus for carrying out esterification, ester interchange or transacetalization reactions by reaction of feed reactants in the presence of fine, particulate catalysts inside a column, which is designed to enable the feed reactants and the resulting reaction products to be brought in gas-liquid contact therein, and the reaction products to be distilled therein and to be successively removed therefrom, the said apparatus comprising a column surrounding and enclosing a plurality of individual trays superposed one above the other and vertically spaced from each other; a plurality of tray outlet and tray inlet conduits projecting outwardly from the column and delivering liquid phase from a higher tray in the column to the next lower tray therein; a plurality of interchangeable catalyst-receiving reactors being arranged outside the column and connected to the column by means of the said inlet and outlet conduits and placed between the outlet conduit of the said higher tray and the inlet conduit of the said lower tray in the column; each of said reactors being secured below its respective tray inlet conduit; and the respective tray outlet conduit being arranged to by-pass its reactor so as to project from below into the bottom of the reactor, and the tray inlet conduit being arranged to connect the head zone of its reactor to the column.

2. The distilling apparatus of claim 1 wherein the catalyst-receiving reactors outside the column are staggered on opposite sides.

References Cited

UNITED STATES PATENTS

| | | | |
|---|---|---|---|
| 2,762,683 | 9/1956 | Massey | 23—288X |
| 2,839,369 | 6/1958 | Mullins | 23—283X |
| 3,215,504 | 11/1965 | Hagbarth | 23—283 |

JOSEPH SCOVRONEK, Primary Examiner

U.S. Cl. X.R.

23—283; 260—484, 692; 261—114